Patented July 14, 1936

2,047,755

UNITED STATES PATENT OFFICE 2,047,755

PROCESS OF PRODUCING MINERAL OILS OF HIGH SATURATION

William Hunter Volck, Watsonville, Calif., assignor to California Spray-Chemical Corporation, Berkeley, Calif., a corporation of California No Drawing. Application October 14, 1933, Serial No. 693,669

9 Claims. (Cl. 196—13)

This invention relates to a process by which mineral or petroleum oils, or their distillates are treated with a selective solvent to produce oils of higher saturation than that of the untreated oil. By this invention petroleum oils are produced which contain a higher proportion of saturated compounds. These oils are especially useful for phytonomic purposes and for lubricating, toilet and other uses in which excessive proportions of unsaturated organic constituents cause a deleterious effect.

By this invention oils of higher saturation are produced from petroleum oils, or their distillates, by a selective solvent whose selectivity has been improved by the addition of a small proportion of an hydroxylated compound. When the correct proportion of the hydroxylated compound is added to the selective solvent and the mixture is used in treating a mineral oil, an excellent volume of raffinate is obtained which has a high saturation.

In extracting the unsaturated constituents from petroleum oils it has heretofore been customary to use sulphuric acid or sulphur dioxide. When sulphuric acid is used for this purpose a portion of the acid is consumed, organic material of potential value is destroyed and a sludge is formed which is difficult and obnoxious to handle. When sulphur dioxide is used the operation is conducted under pressure in expensive apparatus. In either case it is essential that the last traces of the chemicals that are used for treating the oil be removed before the oil is marketable.

Instead of employing either of these powerful inorganic agents I use in the practice of this invention an organic selective solvent to which has been added a small amount of a solution of a compound containing an hydroxyl radical. The organic selective solvent which I propose to use extracts too large a proportion of oil to be an economical selective solvent. Therefore, I add to it the solution of a compound containing a hydroxyl radical which, when used up to certain amounts, greatly reduces the solubility of the selective solvent for saturates and reduces the solubility of the selective solvent for unsaturates to a much less extent. Not only is the extraction of the saturates reduced, but the yield of the raffinate is increased. The solution of the compound containing an hydroxyl radical will hereafter in this specification be termed the "modifier".

In carrying out this invention acetone is used as the selective solvent and the compound containing the hydroxyl radical or the modifier is concentrated ammonia, NH4OH. I find that when the selective solvent, acetone, is used alone it extracts too large a proportion of the saturates to give an economical yield of raffinate. However, I find that when a small percentage of ammonia is added to the acetone that it becomes an effective solvent. It is found that the ammonia is more effective than the equivalent amount of water and also the amount of water which the ammonia contains. This is because the saturations of the raffinate produced by ammoniated acetone are higher than those produced by equivalent proportions of acetone and water.

The following is given as a specific example of carrying out the invention, but it is to be understood that the invention is not restricted to the specific example or to the exact proportions or other conditions that are stated:

1000 volumes of a California oil containing 703 volumes of saturates and 297 volumes of unsaturates were treated at about 22° C. with 4333 volumes of acetone to which 7% of ammonia, 24.8% NH3 by weight, had been added, and a yield of 710 volumes of raffinate was obtained. In an independent series of trials in which water alone was used it was found that the water alone in the 7% of ammonia would yield about 668 volumes of raffinate, and that 7% of water would yield 770 volumes of raffinate. However, the saturations obtained with acetone and ammonia were better than those obtained by acetone and water. The increase in saturation when 7% ammonia was used, was 13.2%; when an amount corresponding to the water in 7% ammonia was used, the increase in saturation was 12.7% and when 7% of water was used the increase in saturation was 11%. The products of the yields times the improvements in saturation were for ammonia 9372, for the water contained in the ammonia 8484, and for 7% water 8470. A series of tests in which different percentages of ammonia were used gave the following data which are expressed in terms of yield times improvement in saturation.

| Ammonia added, percent | 0 | 1 | 3 | 5 | 7 | 10 |
|---|---|---|---|---|---|---|
| Yield times percent improvement | 5015 | 6343 | 8306 | 8844 | 9372 | 8666 |

Any one of four methods may be used in the treatment of petroleum oils or their distillates with acetone mixed with ammonia as a modifier: (1) the single treatment of batches, (2) the repeated treatment of batches, (3) the counter current batch treatment, and (4) the counter-current flow treatment. In all of them the oil is mixed with the ammoniated acetone in a suitable device for about half a minute and the mixture is conveyed to a settling tank or equivalent device, where it divides into two layers, namely the raffinate and the extract. The temperature during the treatment may be from about 0° C. to about 40° C. These layers are then separated by decantation, or in any other suitable way. The raffinate contains the unextracted oil which is composed of a larger proportion of saturated oil and a smaller proportion of unsaturated oil than was present in the original oil, in addition to a small amount of dissolved solvent. The extract is composed of the major part of the solvent and the extracted oil which contains a greater proportion of unsaturated oil and a less proportion of saturated oil than was present in the original oil. In the method of repeated batch treatments the raffinate is treated two or more times with fresh solvent. In the counter-current method the oil advances from treatment to treatment and first meets nearly spent solvent and then progressively fresher solvent, until fresh solvent is used in the final treatment. In all cases the solvent may be recovered from the highly saturated oil of the final raffinate and the less saturated oils of the extracts by a suitable method, such as distillation, for example, and used again in the process. The raffinates are filtered to clarify the oil and remove the coloring matter. The extracts are treated as their disposition demands.

The most advantageous removal of the unsaturated constituents of oil is obtained by a careful regulation of the amount of ammonia that is added to the acetone. As already explained, the addition of about 7 percent of strong ammonia produces a good extraction of unsaturates. However, variations from this percentage may be advisable in order to obtain most satisfactory results under different conditions that arise in plant operation. In the repeated batch treatment the percentage of ammonia added sometimes needs to be changed from batch to batch and in the counter-current methods from stage to stage. The best percentages to be used can be ascertained by tests. The ammonia may be added to the solvent liquor in water with or without additional acetone. Percentages of ammonia ranging from one to ten percent of the acetone have been found to be satisfactory.

The proportion of the volume of the solvent used in the treatment to that of the oil depends on the saturation of the raw oil, the saturation of the raffinate desired, and the method of extraction. In the single treatment more solvent is required in the repeated batch treatment and more in the latter than in the counter-current methods. The amount used preferably varies from about one to twenty-four times the volume of the oil treated.

I claim:

1. The process of producing oils of high saturation, which comprises treating petroleum oils or their distillates with acetone to which a small percentage of ammonia has been added.

2. The process of producing oils of high saturation, which comprises treating petroleum oils or their distillates with acetone to which has been added an amount of strong ammonia which varies from about one to ten percent of the volume of the acetone.

3. The process of producing oils of high saturation which comprises treating petroleum oils or their distillates with acetone to which has been added a small percentage of strong ammonia which varies in amount from about one to twenty-four times the volume of the oil treated.

4. The process of producing oils of high saturation, which comprises treating petroleum oils or their distillates with acetone to which a small percentage of ammonia has been added at a temperature between 0° C. and about 40° C.

5. The process of producing oils of high saturation, which comprises treating petroleum oils or their distillates for a period of about thirty seconds with acetone to which a small percentage of ammonia has been added.

6. The process of producing oils of high saturation which comprises treating petroleum oils or their distillates with acetone to which a small percentage of ammonia has been added, allowing the emulsion to settle into two layers, removing the raffinate, separating the contained solvent from the raffinate, and filtering the raffinate.

7. The process of producing oils of high saturation, which comprises treating petroleum oils or their distillates with acetone to which a small percentage of ammonia has been added, allowing the emulsion to settle into two layers, removing the extract, and driving off the solvent from the oil.

8. The process of producing oils of high saturation, which comprises treating petroleum oils or their distillates with acetone to which a small percentage of ammonia has been added, allowing the emulsion to settle, separating the raffinate, treating it repeatedly with the mixture of acetone and ammonia, separating after each treatment, driving off the solvent contained in the last separated raffinate, and filtering.

9. The process of producing oils of high saturation, which comprises treating petroleum oils or their distillates with a mixture of acetone and ammonia in a counter-current flow, allowing the emulsion to separate, removing the raffinate, driving off the solvent, and filtering.

WILLIAM HUNTER VOLCK.